United States Patent [19]

Okoshi

[11] Patent Number: 4,537,086
[45] Date of Patent: Aug. 27, 1985

[54] INFINITELY VARIABLE TORIC TRANSMISSION

[75] Inventor: Hideo Okoshi, Fujisawa, Japan

[73] Assignee: Nippon Seiko Kabushiki Kaisha, Tokyo, Japan

[21] Appl. No.: 579,374

[22] Filed: Feb. 13, 1984

[30] Foreign Application Priority Data

Feb. 21, 1983 [JP] Japan .................................. 58-26290

[51] Int. Cl.$^3$ ...................... F16H 15/08; F16H 15/00
[52] U.S. Cl. ...................................... 74/201; 74/200; 74/190
[58] Field of Search ............... 74/200, 201, 190, 190.5

[56] References Cited

U.S. PATENT DOCUMENTS

| | | | |
|---|---|---|---|
| 4,434,675 | 3/1984 | Kraus | 74/200 |
| 4,444,068 | 4/1984 | Kraus | 74/200 |
| 4,453,427 | 6/1984 | Kraus et al. | 74/200 |

Primary Examiner—Lawrence Staab
Assistant Examiner—Michael D. Bednarek
Attorney, Agent, or Firm—Shapiro and Shapiro

[57] ABSTRACT

An infinitely variable toric transmission has a housing, input and output shafts rotatably and coaxially supported in the housing, toric input and output disks fitted on and engaged with the input and output shafts, respectively, for rotation together, the opposed surfaces of the disks cooperating with each other to form a toric cavity, two right and left traction rollers disposed in the toric cavity symmetrically with respect to the axis of the input and output shafts, trunnion devices rotatably supporting the traction rollers and supported in the housing through upper and lower support link members for rightward and leftward pivotal movement about a pivot axis perpendicular to the rotational axes of the traction rollers, and pressing means for abutting the input and output disks and the traction rollers into engagement with each other and generating a traction force. One of the upper and lower support link members is supported in the housing by a sliding post for slight rightward and leftward movement and the other of the upper and lower support link members has its central portion tiltably supported in the housing by a spherical post. The transmission is characterized in that hydraulic cylinder devices are provided which extend on the upper and lower pivot shaft ends, respectively, of the right and left trunnion devices, the right and left cylinder diameter of the cylinder devices which is adjacent to the spherical post is larger than the right and left cylinder diameter of the cylinder devices which is adjacent to the sliding post, and the cylinder devices on each diagonal are conjunctioned with each other by pipings.

2 Claims, 2 Drawing Figures

INFINITELY VARIABLE TORIC TRANSMISSION

BACKGROUND OF THE INVENTION

1. Field of the Invention

This invention relates to an infinitely variable toric transmission and provides an infinitely variable toric transmission of smaller power loss and larger transmission torque capacity.

2. Description of the Prior Art

An infinitely variable toric transmission having toric input and output disks fitted on input and output shafts, respectively, disposed on the same axis and rotatable together, and two right and left traction rollers disposed in a toric cavity which the opposed surfaces of the input and output disks cooperate with each other to form, the traction rollers being abutted firmly against each other to engage the input and output disks and transmit a large torque by a traction force created in the portions of engagement, and wherein the two right and left traction rollers are rotatably supported on two right and left trunnions through bearings, and the two right and left trunnions are pivotably mounted in a housing by upper and lower support link members, respectively, and both of the upper and lower mounted portion are slightly tiltable by a spherical post is disclosed in Japanese Laid-open Patent Application No. 47060/1982 (U.S. patent application Ser. No. 168,521).

In this transmission, both of the upper and lower support link members are supported by a spherical post and therefore, due to unspecific causes such as the working error of each member, the assembly accuracy and the flexure during the operation of the transmission, the forces applied to the portions of engagement of the right and left traction rollers actually are not always maintained balanced, but one of them on which an excessively small force is exerted begins to slide earlier, and this has led to the undesirable possibility that the torque transmission capacity is reduced or a loss of power results.

Therefore, to automatically equalize the influences of the working error, the assembly accuracy and the flexure and thereby eliminate the aforementioned unspecific adverse effects, an attempt has been made to mount one of the upper and lower support link members in the housing by a spherical post as previously described and support the other of the upper and lower support link members on the housing by a sliding post for slight rightward and leftward movement.

However, the present applicant has found that in this transmission, pressure forces (tangential load and vertical load) created in the portions of engagement of the right and left traction rollers with the input and output disks are theoretically not equal to each other. That is, it has been found that even if the aforementioned unspecific causes can be eliminated at all, the pressure forces applied to the right and left traction rollers do not become equal to each other and one of the traction rollers still begins to slide earlier and this hampers the improvement of the torque transmitting efficiency.

SUMMARY OF THE INVENTION

The present invention has been made on the basis of the above-described idea and an object thereof is to provide an infinitely variable toric transmission of smaller power loss and larger transmission torque capacity.

The invention will become fully apparent from the following detailed description thereof taken in conjunction with the accompanying drawings.

DESCRIPTION OF THE PREFERRED EMBODIMENT

Figure 1:
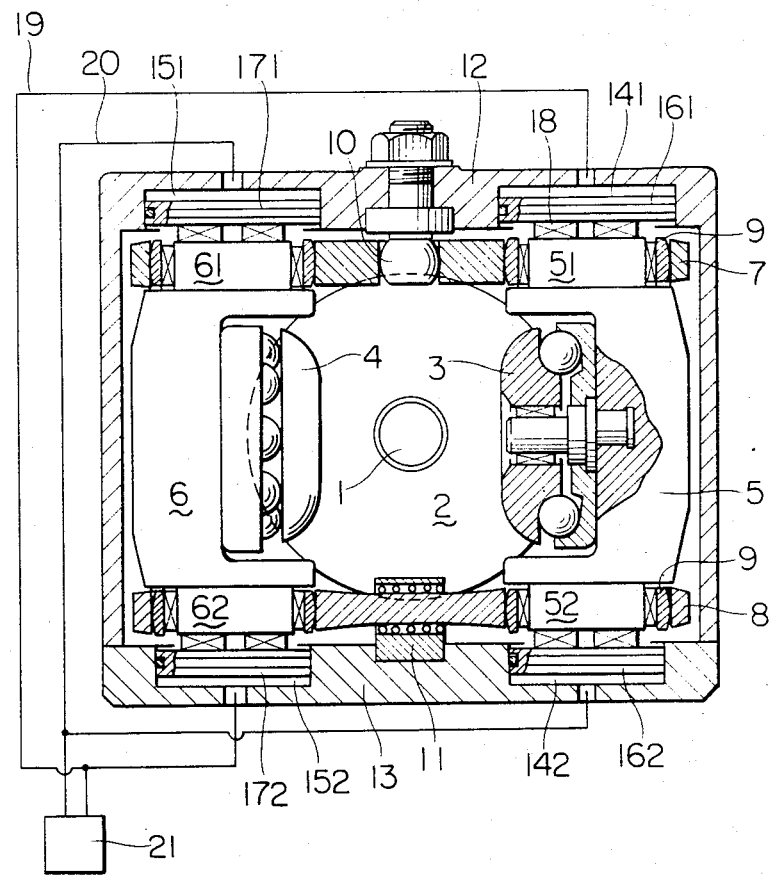
FIG. 1 is a transverse sectional view showing the essential portions of an infinitely variable toric transmission according to an embodiment of the present invention.

Referring to FIG. 1 which is a transverse sectional view of an infinitely variable toric transmission according to an embodiment of the present invention, an input (output) disk 2 is fitted on an input (output) shaft 1 shown as an end face and they are engaged with each other, respectively, by an engaging member in a well-known manner so that they may rotate together.

The opposed surfaces of the input (output) disk 2 cooperate with each other to form a toric cavity in which two right and left traction rollers 3 and 4 are rotatably supported by trunnions 5 and 6, respectively, and are abutted firmly with the input (output) disk 2. The upper and lower pivot shafts 51, 52, 61 and 62 of the trunnions 5 and 6 are held by upper and lower support link members 7 and 8, respectively, through spherical configured bearings 9. The upper support link member 7 has its central portion attached to a housing 12 through a spherical post 10, and the lower support link member 8 has its substantially central portion attached to a housing lid 13 through a linear motion bearing 11.

Hydraulic cylinders 141, 142, 151 and 152 extend on the respective pivot axes of the trunnions 5 and 6 and the cylinders 141 and 152, 142 and 151 on the diagonals are conjunctioned with each other by pipings 19 and 20, respectively, as shown. Reference numeral 21 designates a hydraulic pressure supply device.

Pistons 161, 162, 171 and 172 are provided in the respective cylinder chambers. These pistons are preferably in contact with the pivot shaft ends of the trunnions 5 and 6 through thrust bearings 18. The inside diameter of the right and left cylinders 141 and 151 which are adjacent to the spherical post 10 is made larger than that of the right and left cylinders 142 and 152 which are adjacent to the linear motion bearing 11, on the basis of the theoretical design. This will hereinafter be described in detail by reference to FIG. 2.

When a torque T is applied to the input shaft 1, a tangential force $F_t$ and a vertical load Fa are produced a the point of engagement "a" between the input disk 2 and the traction roller 3 correspondingly to the torque T. Likewise, a tangential force $Ft_2$ and a vertical load Fb are produced at the point of engagement "b" between the input disk 2 and the traction roller 4. The tangential forces $Ft_1$ and $Ft_2$ are balanced with reaction forces exerted on the cylinders 142 and 151, respectively, and produce moments $mFt_1$ and $mFt_2$, as shown, depending on the distance "m" from the pivot shaft of each trunnion, and by these moments, $m/l\,Ft_1$ is applied to the point of engagement "a" and the pivot shaft end 51 and $m/l\,Ft_2$ is applied to the point of engagement "b" and the pivot shaft end 61, as shown. The sum of these forces, i.e., $m/l\,(Ft_1 + Ft_2)$, is supported by the spherical post 10 and therefore, after all, the vertical load at the point of engagement "a" is $(Fa - m/l\,Ft_1)$ and the vertical load at the point of engagement "b" is (Fb+m/l Ft$_2$). The shown forces Fa/2 and Fb/2 exerted on the pivot shaft ends 52 and 62 are balanced with each other by the linear motion bearing 11 and therefore, after all, Fa=Fb and if this force is F, the vertical load applied to the point "a"=$F-m/l$ Ft$_1$ the vertical load applied to the point "b"=$F+m/l$ Ft$_2$.

In the infinitely variable toric transmission by traction force, if the product (traction force) of the above-mentioned vertical loads and the traction coefficients $\mu_1$ and $\mu_2$ at the respective points of engagement is equal to the tangential forces Ft$_1$ and Ft$_2$, then $$Ft_1 = \mu_1(F - m/l\ Ft_1)$$

$$Ft_2 = \mu_2(F = m/l\ Ft_2).$$

Describing the difference of the present invention from the prior art, the diameters of the cylinders 141, 142, 151 and 152 are all equal in the prior art and therefore, the tangential force Ft$_1$=Ft$_2$. Accordingly, as is apparent from the foregoing equations, $\mu_1 > \mu_2$. Now, the traction coefficient increases with an increase in slip factor at first but gradually decreases via a maximum value and therefore, at the point "a" which requires a larger traction coefficient ($\mu_1$), the traction coefficient reaches a maximum value because of a smaller tangential force Ft$_1$ than at the point "b" which requires a smaller traction coefficient ($\mu_2$), and if the tangential force exceeds that level, slip increases sharply. Accordingly, there has occurred in the prior art the phenomenon that torque transmission becomes impossible in spite of the fact that the point "b" still has a tangential force in reserve.

In contrast with this prior art, in the present invention, as will later be described, the diameter of the cylinders 141 and 151 which are adjacent to the spherical post is made larger on the basis of the theoretical design than the diameter of the cylinders 142 and 152 adjacent to the sliding post, whereby the traction coefficients $\mu_1$ and $\mu_2$ at the points "a" and "b" are made equal to each other. This is the technical idea of the present invention.

Now, if $\mu_1 = \mu_2 = \mu$ in the foregoing equations, $$Ft_1 = \mu(F - m/l\ Ft^1)$$

$$Ft_2 = \mu(F + m/l\ Ft_2).$$

From this, $$Ft_1 = \frac{\mu}{1 + \frac{\mu m}{l}} F$$

$$Ft_2 = \frac{\mu}{1 - \frac{\mu m}{l}} F.$$

Figure 2:
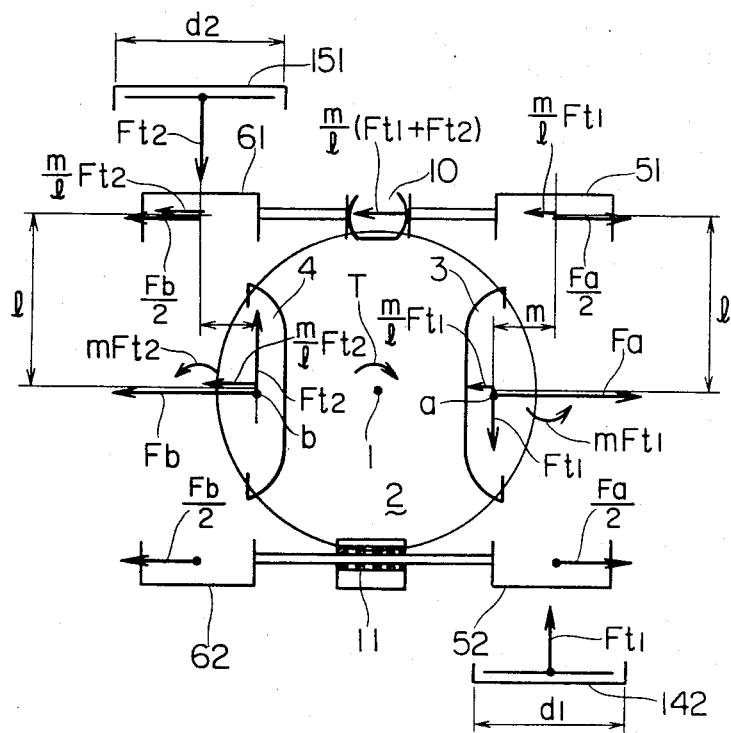
FIG. 2 illustrates the force diagram in the transmission of FIG. 1.

If the ratio of Ft$_2$ to Ft$_1$ is K, $$K = \frac{Ft_2}{Ft_1} = \frac{l + \mu m}{l - \mu m}$$

and therefore, if the diameter d2 of the cylinder 151 (and 141) and the diameter d1 of the cylinder 142 (and 152) are determined so that $$\left(\frac{d2}{d1}\right)^2 = K,$$

the force diagram shown in FIG. 2 is all balanced and an optimum tangential force (=traction force) matching the vertical load is exerted on the points "a" and "b" and therefore, a maximum torque can be transmitted. Thus, there can be provided an infinitely variable toric transmission in which no useless force is created and which is not affected by unspecific causes such as working error, assembly error and flexure during operation and moreover smaller power loss and larger transmission torque capacity are provided.

I claim:

1. An infinitely variable toric transmission having a housing, input and output shafts rotatably and coaxially supported in said housing, toric input and output disks fitted on and engaged with said input and output shafts, respectively, for rotation together, the opposed surfaces of said disks cooperating with each other to form a toric cavity, two right and left traction rollers disposed in said toric cavity symmetrically with respect to the axis of said input and output shafts, trunnion devices rotatably supporting said traction rollers and supported in said housing through upper and lower support link members for rightward and leftward pivotal movement about a pivot axis perpendicular to the rotational axes of said traction rollers, and pressing means for abutting said input and output disks and said traction rollers into engagement with each other and generating a traction force, one of said upper and lower support link members being supported in said housing by a sliding post for slight rightward and leftward movement and the other of said upper and lower support link members having its central portion tiltably supported in said housing by a spherical post, characterized in that hydraulic cylinder devices are provided which extend on the upper and lower pivot shaft ends, respectively, of said right and left trunnion devices, the right and left cylinder diameter of said cylinder devices which is adjacent to said spherical post is larger than the right and left cylinder diameter of said cylinder devices which is adjacent to said sliding post, and the cylinder devices on each diagonal are conjunctioned with each other by pipings.

2. An infinitely variable toric transmission according to claim 1, wherein the pistons of said cylinder devices extending on the upper and lower pivot shaft ends of said right and left trunnion devices are disposed at said pivot shaft ends, respectively, through thrust bearings.

* * * * *